United States Patent
Kawamura et al.

(10) Patent No.: US 7,519,985 B2
(45) Date of Patent: Apr. 14, 2009

(54) RADIO COMMUNICATION SYSTEM, RADIO COMMUNICATION CONTROL APPARATUS, RADIO COMMUNICATION CONTROL METHOD, RECORDING MEDIUM, AND COMPUTER PROGRAM

(75) Inventors: Harumi Kawamura, Tokyo (JP); Hisato Shima, Tokyo (JP)

(73) Assignee: Sony Corporation, Tokyo (JP)

( * ) Notice: Subject to any disclaimer, the term of this patent is extended or adjusted under 35 U.S.C. 154(b) by 825 days.

(21) Appl. No.: 10/381,868

(22) PCT Filed: Jul. 30, 2002

(86) PCT No.: PCT/JP02/07714

§ 371 (c)(1),
(2), (4) Date: Mar. 28, 2003

(87) PCT Pub. No.: WO03/013068

PCT Pub. Date: Feb. 13, 2003

(65) Prior Publication Data

US 2004/0042413 A1 Mar. 4, 2004

(30) Foreign Application Priority Data

Jul. 30, 2001 (JP) .............................. 2001-229078

(51) Int. Cl.
*H04L 9/00* (2006.01)
(52) U.S. Cl. .............................. 726/2; 726/3; 380/270; 455/410; 455/411
(58) Field of Classification Search ................ 380/247, 380/255, 270, 200, 201, 229, 241, 242; 713/155, 713/168–170, 300, 320, 310, 340; 455/410, 455/411, 41.2, 41.3, 574, 26.1; 370/252, 370/254; 726/1, 2, 36, 27–30, 22
See application file for complete search history.

(56) References Cited

U.S. PATENT DOCUMENTS

| | | | |
|---|---|---|---|
| 5,721,781 A | 2/1998 | Deo et al. | |
| 5,784,566 A | 7/1998 | Viavant et al. | |
| 5,918,174 A * | 6/1999 | Chennakeshu et al. | 455/427 |
| 5,935,248 A * | 8/1999 | Kuroda | 726/14 |
| 5,949,484 A * | 9/1999 | Nakaya et al. | 348/384.1 |
| 6,006,100 A * | 12/1999 | Koenck et al. | 455/466 |
| 6,182,215 B1 * | 1/2001 | Tatebayashi et al. | 713/168 |
| 6,311,224 B1 * | 10/2001 | Packard | 709/247 |
| 6,438,643 B1 * | 8/2002 | Ohara et al. | 711/103 |
| 6,510,236 B1 * | 1/2003 | Crane et al. | 382/116 |
| 6,782,476 B1 * | 8/2004 | Ishibashi | 713/169 |
| 6,859,879 B2 * | 2/2005 | Henn et al. | 726/1 |
| 6,912,373 B2 * | 6/2005 | Lee | 455/41.2 |
| 2002/0016818 A1 * | 2/2002 | Kirani et al. | 709/203 |
| 2002/0083319 A1 * | 6/2002 | Ishiguro et al. | 713/168 |
| 2004/0052233 A1 * | 3/2004 | Skog et al. | 370/338 |

FOREIGN PATENT DOCUMENTS

| | | |
|---|---|---|
| EP | 0 977 436 A1 | 2/2000 |
| JP | 6-261033 | 9/1994 |
| JP | 8-297638 | 11/1996 |
| JP | 2000-59323 | 2/2000 |
| JP | 2001-312472 | 11/2001 |

* cited by examiner

*Primary Examiner*—Kimyen Vu
*Assistant Examiner*—Nirav Patel
(74) *Attorney, Agent, or Firm*—Finnegan, Henderson, Farabow, Garrett & Dunner, L.L.P.

(57) ABSTRACT

When transmitting data such as audio data which require protection to be provided, difficulty levels of authentication are switched corresponding to processing power of equipments to communicate. Thus, for an equipment of low processing power may perform a Bluetooth communication based on the SDMI. Further, for a communicating counter-party which is an equipment of high processing power, such as a personal computer, sufficient countermeasures against hacking may be taken.

9 Claims, 14 Drawing Sheets

| 7 | 6 | 5 | 4 | 3 | 2 | 1 | 0 | OCTED |
|---|---|---|---|---|---|---|---|---|
| SIGNALING HEADER ||||||||  0 |
| 0 | 0 | AVDTP_GET_CAPABILITIES |||||| 1 |
| STREAM END POINT IDENTIFIER(SEID) |||||| 1 | 1 | 2 |

| 7 | 6 | 5 | 4 | 3 | 2 | 1 | 0 | OCTED |
|---|---|---|---|---|---|---|---|---|
| SIGNALING HEADER ||||||||  0 |
| 1 | 0 | AVDTP_GET_CAPABILITIES |||||| 1 |
| STREAM END POINT IDENTIFIER(SEID) ||||| IN USE | 1 | 2 |
| SERVICE CAPABILITY |||||||| 3 |

FIG.13

| 7 | 6 | 5 | 4 | 3 | 2 | 1 | 0 | OCTED |
|---|---|---|---|---|---|---|---|---|
| SERVICE CATEGORY=CONTENT PROTECTION ||||||||  0 |
| LENGTH OF SERVICE CAPABILITIES(LOSC)=0 × 02 |||||||| 1 |
| CP_TYPE_LSB |||||||| 2 |
| CP_TYPE_MSB |||||||| 3 |

FIG.14

| 7 | 6 | 5 | 4 | 3 | 2 | 1 | 0 | OCTED |
|---|---|---|---|---|---|---|---|---|
| SIGNALING HEADER |||||||| 0 |
| 0 | 0 | AVDTP_SECURITY_CONTROL |||||| 1 |
| STREAM END POINT IDENTIFIER(SEID) |||||| 1 | 1 | 2 |
| CONTENT PROTECTION SCHEME DEPENDENT |||||||| ⋮ |

FIG.15

| 7 | 6 | 5 | 4 | 3 | 2 | 1 | 0 | OCTED |
|---|---|---|---|---|---|---|---|---|
| SIGNALING HEADER |||||||| 0 |
| 0 | 0 | AVDTP_SECURITY_CONTROL |||||| 1 |
| STREAM END POINT IDENTIFIER(SEID) |||||| 1 | 1 | 2 |
| CONTENT PROTECTION SCHEME DEPENDENT |||||||| 3 |

FIG. 16

| COMMAND CLASS :TYPE INQUIRY | 0 | 0 | 0 | 0 |

FIG. 17

| RESPONSE CLASS:TYPE | VALUE (0-15) |

FIG. 18

| octet 3 | octet 2 | octet 1 |

←——11 BITS——→←—5 BITS—→←—6 BITS—→

| RESERVED AREA FOR SERVICE CLASS | MAJOR DEVICE CLASS | MINOR DEVICE CLASS | 00 |

FORMAT TYPE (CLASS OF DEVICE)

FIG. 19

| 12 11 10 9 8 | MAJOR DEVICE CLASS |
|---|---|
| 0 0 0 0 0 | THE OTHERS |
| 0 0 0 0 1 | COMPUTERS (DESKTOP,NOTEBOOK,PDA, ORGANIZER) |
| 0 0 0 1 0 | TELEHONES (CELLULAR,CORDLESS, PAYPHONE,MODEM,...) |
| 0 0 0 1 1 | LAN/ACCESS POINT OF NETWORK |
| 0 0 1 0 0 | AUDIO/VIDEO(HEADSET,SPEAKER, STEREO SET,VIDIEO DISPLAY,VCR) |
| 0 0 1 0 1 | PERIPHERALS (MOUSE,JOYSTIK,KEYBORD) |
| 0 0 1 1 0 | IMAGE PROCESSIN (PRINTING,SCANNER, CAMERA,DISPLAY,...) |
| 1 1 1 1 1 | UNCLASSIFIED SPECIFIC DEVICE CODE |
| X X X X X | ALL OTHER RESERVED VALUES |

FIG.20

| COMMAND CLASS: AUTHENTICATION | 0 | 0 | 0 | 0 |
|---|---|---|---|---|
| x | | | | |

FIG.21

| RESPONSE CLASS: AUTHENTICATION | 0 | 0 | 0 | 0 |
|---|---|---|---|---|
| f(x) | | | | |

FIG.24

| Profile Name | UUID |
|---|---|
| SERIAL PORT | 0 × 1101 |
| LAN ACCESS | 0 × 1102 |
| DIALUP NETWORKING | 0 × 1103 |
| OBJECT PUSH | 0 × 1105 |
| FILE TRANSFER | 0 × 1106 |
| HEADSET | 0 × 1108 |
| ADVANCED AUDIO DISTRIBUTION | 0 × 110D |
| A/V REMOTE CONTROL | 0 × 110F |
| PAN | 0 × 1115 |

RADIO COMMUNICATION SYSTEM, RADIO COMMUNICATION CONTROL APPARATUS, RADIO COMMUNICATION CONTROL METHOD, RECORDING MEDIUM, AND COMPUTER PROGRAM

TECHNICAL FIELD

The present invention relates to a radio communication system, a radio communication control apparatus and a radio communication control method, a storage medium, and a computer program, for connecting a plurality of equipments by wireless, in particular to a radio communication system, a radio communication control apparatus and a radio communication control method, a storage medium, and a computer program for transmitting audio data among a plurality of equipments connected by wireless within a predetermined communication cell.

More particularly, the present invention relates to a radio communication system, a radio communication control apparatus and a radio communication control method, a storage medium, and a computer program, for transmitting audio data between equipments within a piconet including a master equipment and a plurality of slave equipments, such as Bluetooth, specifically to a radio communication system, a radio communication control apparatus and a radio communication control method, a storage medium, and a computer program, for transmitting digital data such as audio data between Bluetooth equipments with providing the digital data with predetermined protection.

BACKGROUND ART

Recently, digital recording apparatuses such as a digital VTR, MD (Mini-Disc (a trademark)) recording and reproducing apparatus have been becoming widely used. Further, a DVD (Digital Videodisc (a trademark) or Digital Versatile Disc) have appeared and are installed in equipments such as a personal computer (PC).

As for such digital information recording apparatuses, it may be even easy to duplicate data or contents in a digital format or to alter them, thus the data and contents may be so unguarded as to be exposed to the risk of copyright infringement. Thus, it is not considered to be sufficient to simply tighten copyright laws and other laws and regulations relating to duplication, and in view of information technology it is considered to be necessary to support right use of data and contents or exclude fraudulent use thereof, thereby promoting copyright protection.

For example, for the purpose of protecting copyrights of digital music, major record companies in the United States took a central role in establishing a forum called SDMI (Secure Digital Music Interactive) in 1998. In accordance with the SDMI, it is prohibited to externally output contents of a digital format without any protection on them, therefore, it is defined to be essential that data contents to be transmitted are protected in case a content is output from an audio reproducing player to a rendering apparatus such as a loud speaker and headphones or in case the contents are output to recording equipments such as a DVD-R drive, a personal computer (PC), for example, (that is, prohibition of "unprotected digital out").

For example, in the SDMI a function of so-called "Screening" is defined as a gadget for protecting copyrights in a portable music reproducing player. The Screening is the gadget for checking whether a content may be copied on a memory recorder of a portable device (PD), and it has been agreed that an electronic watermark is employed. For example, The Screening may be applied by means of the electronic watermark so as to exclude fraudulently delivered contents and once (or permitted times) copied contents from further copying.

Such SDMI requirements are considered to be essential not only in the case of cable connection between portable equipments but also in the case of wireless interconnection between the equipments.

Recently, "Bluetooth™" which is a representative example of short distance radio communication has been becoming widely used and installed in a variety of information equipments. The Bluetooth is a standard which provides a wireless connection interface applicable to a variety of fields, and "Bluetooth SIG (Special Interest Group)" has an authority to administer and manage the standard.

The Bluetooth uses a global radio frequency referred to as ISM (Industry Science Medical) band of 2.4 GHz and provides a general data transmission rate of 1 Mbps in which a synchronous transmission channel of 64 kbps applicable to voice transmission of telephone and an asynchronous transmission channel for data transmission.

The former synchronous transmission channel employs an SCO (Synchronous Connection Oriented Link) transmission system and is applied to interconnection between lines. And the latter asynchronous transmission channel employs an ACL (Asynchronous Connection Less Link) transmission system and is applied to data transmission by packet switching. A connection range between equipments through the Bluetooth is about 10 m and may be extended up to 100 m by using additional amplifier.

Technical specifications of the Bluetooth are generally classified into "Core" and "Profile." The Core defines a base of wireless interconnection provided by the Bluetooth. Whereas, the Profile is a group of technical requirements which are defined for respective functions to ensure interconnectivity between equipments when different functions or applications developed based on the Bluetooth are installed in the equipments.

There are a plurality of Profiles in the Bluetooth which are combined to provide a single application (also referred to as an usage model (Usage)). In practice, a combination of profiles providing the application is mounted in a Bluetooth product together with the Core.

For example, a variety of Bluetooth Profiles such as those concerning a cellular phone and a personal computer and further concerning an automobile, a network, a printer, audio, video, etc. may be assumed.

For example, as a Profile for transmitting audio data, "Bluetooth Advanced Audio Distribution Protocol" (A2DP) may be quoted. According to this Profile, wireless interconnection between an AV reproducing equipment and rendering apparatus such as a loud speaker or headphones and wireless connection between the AV reproducing equipment and a rendering apparatus such as a DVD-R drive or a personal computer (PC) may be achieved.

In such an AV equipment equipped with the Bluetooth, in order to comply with the above-mentioned SDMI, there is a need for equipping a gadget for prohibiting "unprotected digital out" or a gadget for protecting an audio data to be digitally transmitted.

The Bluetooth security basically sets a common parameter referred to as "Link Key" between specific two terminals, and one-to-one security is managed between a master and each slave (its link key is not disclosed to a third party).

Elements for protecting digital data are generally classified into two, which are encryption for preventing "wiretapping (eavesdropping)" and authentication for preventing "spoofing."

Since the Bluetooth SIG is not involved in protection systems of contents, each vendor has to protect contents on its hands. However, an authentication system between audio equipments equipped with the Bluetooth must be provided not in a Bluetooth layer but in the application layer which is higher than the former.

The present inventors consider that protection gadgets are different between the use of the Bluetooth communication for rendering (or just listening to) such as headphones and a speaker and the use of the communication for recording.

As for recording, as in the case of Music Download, it is often the case that sufficiently satisfactory protection of high intensity level is applied to each application.

Whereas, as for the rendering, it is unlikely to define how much the intensity should be. It is difficult to require or necessitate the protection of high level for equipments equipped with a CPU of low processing power such as headphones, for example.

In order to apply full authentication of a DTCP (Digital Transmission Content Protection) which is a copy protection standard for i-LINK (IEEE 1394), for example, a load of operating time of about 600 ms is necessary by computing with a CPU of MIPS R4000 100 MHz. It is not practical to impose such cost of a CPU or processing time on terminal portable equipments such as headphones. Further, in a portable equipment based on a battery drive, power consumption can be a problem with system design, and it is difficult to uniformly employ an authentication system of such an overlade level.

On the other hand, a personal computer (PC) equipped with recording function must be prevented from recording fraudulently by pretending to be for rendering.

When an authentication system using 8-bit key, for example, is employed as a rendering use in order to be easily applied to an equipment of lower operating power such as headphones, it may be easily broken by a personal computer of high operating power, thereby reducing effects of its protection.

DISCLOSURE OF THE INVENTION

An object of the present invention is to provide a radio communication system, a radio communication control apparatus and a radio communication control method, a storage medium, and a computer program which are good and where audio data may be suitably transmitted between equipments interconnected by wireless within a predetermined communication cell.

Another object of the present invention is to provide a radio communication system a radio communication control apparatus and a radio communication control method, a storage medium, and a computer program which are good and where audio data may be suitably transmitted between equipments within a piconet comprising a master and a plurality of slaves like Bluetooth.

Another object of the present invention is to provide a radio communication system a radio communication control apparatus and a radio communication control method, a storage medium, and a computer program which are good and where digital data such as audio data may be transmitted between Bluetooth equipments with providing with predetermined protection.

The present invention has been made in view of the above problems, and its first aspect is a radio communication system having a Source apparatus for transmitting a data stream and a Sink apparatus for receiving the data stream in a predetermined radio cell, the system comprises:

a determination means for determining processing power of said Sink apparatus; and an authentication control means for deciding an authentication system between the Source apparatus and the Sink apparatus according to the processing power of the Sink apparatus which has been determined.

What is referred to herein as "system" is that a plurality of apparatuses (or functional modules for realizing specific functions) are gathered regardless of whether each equipment or functional module is provided within a single casing.

Further, the above mentioned radio cell is a "piconet" established by a Bluetooth wireless network, for example. In the piconet, a master apparatus which maintains communication order may carry out one-to-one Bluetooth communication with a plurality of slave apparatuses.

The above mentioned determination means determines whether the Sink apparatus is a first type apparatus of low processing power or a second type apparatus of high processing power. The above mentioned authentication control means employs a comparatively simple authentication system when the Sink apparatus is the first type and employs a comparatively complicated authentication system when the Sink apparatus is the second type.

According to the radio communication system with respect to the first aspect of the present invention, when transmitting data, by means of the Bluetooth connection, such as audio data which require protection to be provided, difficulty levels of the authentication systems are switched corresponding to processing power of the equipments to be communicated so that suitable contents protection may be achieved. Thus, for an equipment of low processing power having only a rendering function such as headphones, the Bluetooth communication based on the SDMI may be performed. Further, for a communicating counterparty which is an equipment having high processing power, such as a personal computer, sufficient countermeasures against hacking may be taken.

The determination means may determine the processing power of the Sink apparatus according to a self-assessment from the Sink apparatus. For example, by using a Stream Get Capability command which is defined by an AVDTP (Audio Video Distribution Transport Protocol) protocol for audio transmission, the processing power of the Sink apparatus may be determined according to the self-assessment from the Sink apparatus.

Further, the determination means may ask the Sink apparatus about the processing power by using Security Command defined by the AVDTP protocol, for example.

Further, the determination means may determine the processing power of the Sink apparatus according to a classification of the Sink apparatus. For example, the processing power of the Sink apparatus may be determined according to Class of Device information obtained during an Inquiry procedure.

Furthermore, the determination means may determine the processing power of the Sink apparatus according to services supported by the Sink apparatus. For example, its processing power may be determined according to services (a protocol or a profile) obtained by a Service Discovery and corresponding to the Sink apparatus.

For example, when the Sink apparatus corresponds to only the A2DP (Bluetooth Advanced Audio Distribution Profile), the determination means may determine that the Sink apparatus is the first type of the low processing power.

Or, when the Sink apparatus corresponds to at least one profile of a PAN (Personal Area Network), a LAN (LAN Access Profile), an Object Push, and a File Transfer, the determination means may determine that the Sink apparatus is not the first type of the low processing power.

The second aspect of the present invention is a radio communication control apparatus and a radio communication control method for transmitting a data stream to a Sink apparatus within a predetermined radio cell, the radio communication control apparatus or the radio communication control method comprises:

a determination means or a determination step for determining processing power of the Sink apparatus; and an authentication control means or an authentication control step for deciding an authentication system between the Source apparatus and the Sink apparatus according to the determined processing power of the sink apparatus.

The radio cell is a piconet established by a Bluetooth wireless network, for example. In the piconet, a master apparatus which maintains communication order may carry out one-to-one Bluetooth communication with a plurality of slave apparatuses. And the radio communication control apparatus or the radio communication control method of the second aspect of the present invention may be mounted in the master apparatus within the Bluetooth piconet.

The determination means or the determination step determines whether the Sink apparatus is the first type apparatus of low processing power or the second type apparatus of high processing power. The authentication control means employs the comparatively simple authentication system when the Sink apparatus is the first type and employs the comparatively complicated authentication system when the Sink apparatus is the second type.

According to the radio communication control apparatus or the radio communication control method with respect to the second aspect of the present invention, when transmitting data, by means of the Bluetooth connection, such as audio data which require protection to be provided, the difficulty levels of the authentication systems are switched corresponding to processing power of the equipments to be communicated so that suitable contents protection may be achieved. Thus, for the equipment of low processing power having only the rendering function such as headphones, Bluetooth communication based on the SDMI may be performed. Further, for a communicating counterparty which is an equipment having high processing power, such as a personal computer, sufficient countermeasures against hacking may be taken.

The determination means or the determination step may determine the processing power of the Sink apparatus
according to the self-assessment from the Sink apparatus. For example, by using the Stream Get Capability command which is defined by the AVDTP protocol for audio transmission, the processing power of the Sink apparatus may be determined according to the self-assessment from the Sink apparatus.

Further, the determination means or step may make inquiries about the processing power of the Sink apparatus by using the Security Control command defined by the AVDTP protocol, for example.

Furthermore, the determination means or step may determine the processing power of the Sink apparatus according to the classification of the Sink apparatus. For example, the processing power of the Sink apparatus may be determined according to the Class of Device information obtained during the Inquiry procedure.

Furthermore, the determination means or the determination step may determine the processing power of the Sink apparatus according to services supported by the Sink apparatus. For example, its processing power may be determined according to services obtained by the Service Discovery and corresponding to the Sink apparatus.

For example, when the Sink apparatus corresponds to only the A2DP, the determination means or the determination step may determine that the Sink apparatus is the first type of the low processing power.

Or, when the Sink apparatus corresponds to at least one profile of the PAN, the LAN, the Object Push, and the File Transfer, the determination means or the determination step may determine that the Sink apparatus is not the first type of the low processing power.

Further, the third aspect of the present invention is a storage medium wherein computer software which is described in a computer-readable format so as to execute, by means of a computer system, transmission control of a data stream for a Sink apparatus within a predetermined radio cell is physically stored, the computer software comprises:

a determination step for determining processing power of the Sink apparatus: and an authentication control step for deciding an authentication system between the Source apparatus and the Sink apparatus according to the determined processing power of the Sink apparatus.

The storage medium with respect to the third aspect of the present invention is a medium for providing the computer software in a computer-readable format to a general-purpose computer system which may execute a variety of program codes, for example. Such media are removable and portable storage media such as a CD (Compact Disc), FD (Flexible Disk), MO (Magneto-Optical Disc), for example. Or, it is technically possible to provide the computer software to a particular computer system by means of transmission media such as a network (regardless of whether the network is wireless or wired).

Such a storage medium defines structural or functional cooperative relationships between the computer software and the storage medium for achieving a function of a predetermined computer software by means of the computer system. In other words, via the storage medium with respect to the third aspect of the present invention, by installing the predetermined computer software in the computer system, a cooperative operation is brought out by means of the computer system, thus achieving functions and effects similar to the radio communication system with respect to the first aspect of the present invention or the radio communication control apparatus and the radio communication method with respect to the second aspect of the present invention.

Further, the fourth aspect of the present invention is a computer program described so as to execute, by means of a computer system, transmission control of a data stream for a Sink apparatus within a predetermined radio cell, the computer program comprises:

a determination step for determining processing power of the Sink apparatus; and an authentication control step for deciding an authentication system between the Source apparatus and the Sink apparatus according to the determined processing power of the Sink apparatus.

The computer program with respect to the fourth aspect of the present invention defines a computer program which is described in a computer-readable format so as to achieve a predetermined process by means of the computer system. In other words, by installing the computer program with respect to the fourth aspect of the present invention in the computer system, a cooperative operation is brought out by means of the computer system, thus achieving functions and effects similar to the radio communication system with respect to the first aspect of the present invention or the radio communication control apparatus and the radio communication control method with respect to the second aspect of the present invention.

Further objects, features and advantages of the present invention will be apparent from embodiments to be described hereafter of the present invention and more detailed description with reference to the accompanying drawings.

BRIEF DESCRIPTION OF THE DRAWINGS

FIG. 13 is a diagram showing a structure of a data frame used for a command and a response of "Stream Set Configuration."

FIG. 14 is a diagram showing a structure of a data frame used for "Security Control" command.

FIG. 15 is a diagram showing a structure of a data frame used for a response to the "Security Control" command.

FIG. 16 is a diagram showing a structure of "Content Protection Scheme Dependent" field of the "Security Control" command when making inquiries about a type.

FIG. 17 is a diagram showing a structure of "Content Protection Scheme Dependent" field of a response to the "Security Control" command when making inquiries about the type.

FIG. 18 is a diagram schematically showing a data structure of Class of Device information field.

FIG. 19 is a diagram showing an allocation of Major Device Class defined by Bluetooth Assigned Numbers.

FIG. 20 is a diagram showing a structure of "Content Protection Scheme Dependent" field of the "Security Control" command when authenticating.

FIG. 21 is a diagram showing a structure of "Content Protection Scheme Dependent" field of a response to the "Security Control" command when authenticating.

FIG. 24 is a diagram showing an example of a UUID (abridgement).

BEST MODE FOR IMPLEMENTING THE INVENTION

Figure 1:
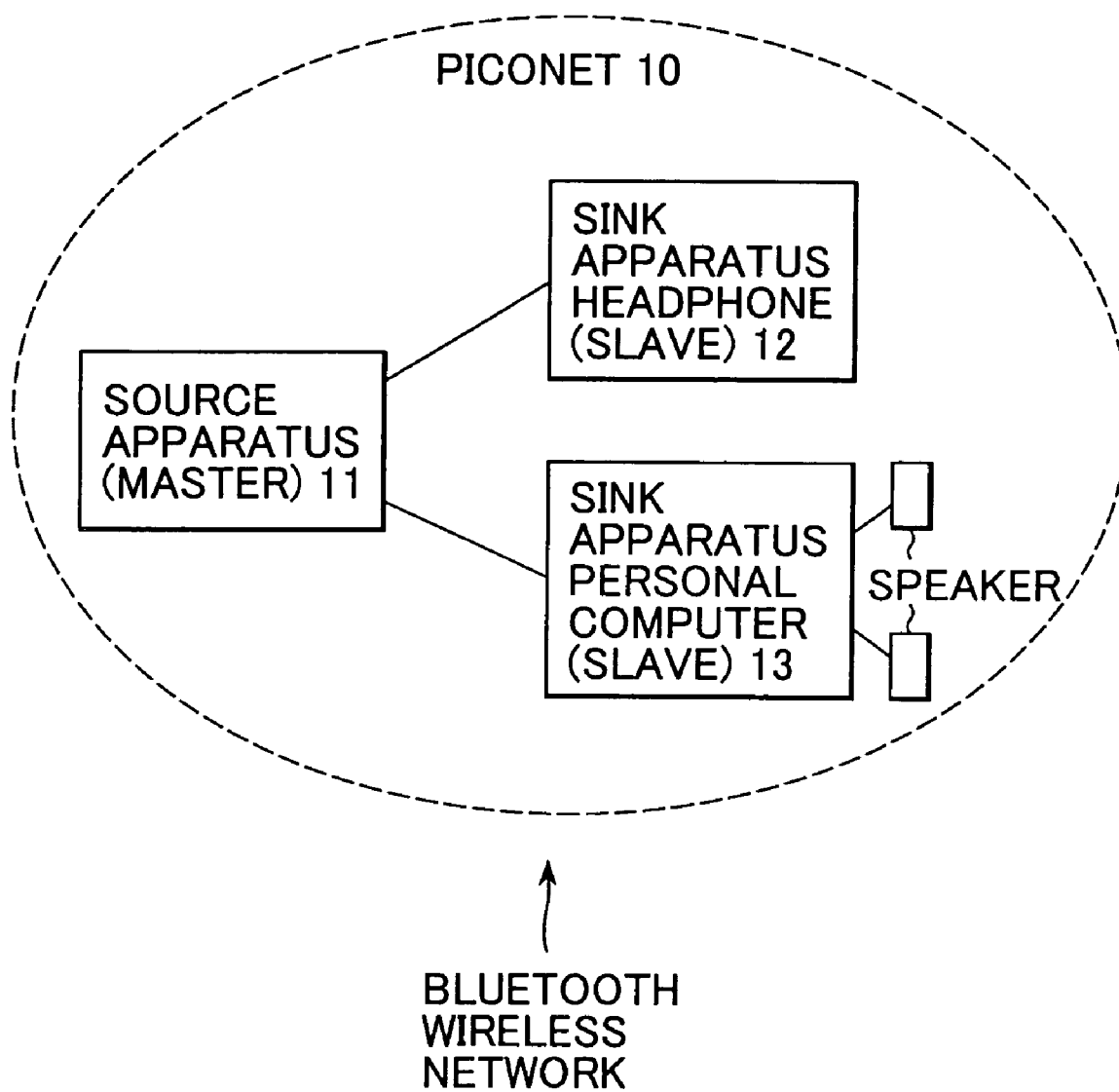
FIG. 1 is a diagram schematically showing a structure within a Bluetooth piconet 10 with respect to an embodiment of the present invention.

Hereafter embodiments of the present invention will be described in detail with reference to the drawings. According to an authentication system with respect to the present invention, only when succeeding in authentication, a counterparty to be communicated can be considered as an equipment to receive a stream for a rendering use. Consequently, without assuming that transmission data may be recorded, the transmission data can be secured with protection of comparatively low intensity.

Taking audio transmission carried out by the Bluetooth as an example, embodiments of the present invention will be described hereafter in detail with reference to the drawings.

The Bluetooth uses a global radio frequency referred to as ISM (Industry Science Medical) of 2.4 GHz and provides a general data transmission rate of 1 Mbps in which a synchronous transmission channel of 64 kbps applicable to voice transmission of telephone and an asynchronous transmission channel for data transmission.

The former synchronous transmission channel employs an SCO (Synchronous Connection Oriented Link) transmission system and is applied to interconnection between lines. And the latter asynchronous transmission channel employs an ACL (Asynchronous Connection Less Link) transmission system and is applied to data transmission by packet switching.

Technical specifications of the Bluetooth are generally classified into a "Core" and a "Profile." The Core defines a base of wireless interconnection provided by the Bluetooth. Whereas, the Profile is a group of technical requirements which are defined for respective functions to ensure interconnectivity between equipments when different functions or developed applications developed based on the core of the Bluetooth are installed in the equipments. There are a plurality of Bluetooth files which are combined to provide an application (also referred to as usage model (Usage)). In practice, a combination of profiles providing the application is mounted in a Bluetooth product together with the Core.

The Bluetooth provides not only one-to-one cable replacement connection but also a structure of a one-many simple wireless network. Thus, communication order is maintained by providing a control function to one of equipments regarding the Bluetooth communication. The equipment provided with the control function is referred to as a "Master" equipment, and the others are referred to as a Slave equipment. A network wherein equipments having become a Master and a Slave are in a communication state is referred to as a "Piconet."

In the piconet, since "synchronicity in piconet" is provided, all Bluetooth equipments which are in a communication state are in a state having the same frequency hopping pattern and time slot based on a master equipment. The time slot is formed by each slave equipment on the basis of a Bluetooth clock signal provided by the master equipment.

There is always one and only master equipment that performs communication while controlling one or more slaves. Further, in the piconet, all packets are received only by between the master equipment and the slave equipment, and slave equipments cannot directly communicate with each other.

And the maximum number of slaves which may carry out simultaneous communication within one piconet is set to seven. Including the master equipment, up to eight Bluetooth equipments may perform the simultaneous communication within the piconet.

In the field of audio-visual (AV) equipments, when the Bluetooth communication is introduced, a Source apparatus 11 to be an audio data stream output source such as a stereo component and a media player is defined as a master. On the other hand, a Sink apparatus to be an audio output target such as headphones and a personal computer (PC) may be defined as a slave equipment. In FIG. 1, there is schematically shown a structure within a Bluetooth piconet 10 constructed in such a manner.

As described above in the paragraphs of Background Art, in order that the Bluetooth wireless network applied to audio transmission in such a manner may be in compliance with the SDMI (Secure Digital Music Interactive), it is necessary to equip a gadget for prohibiting "unprotected digital out" for a transmission line from the Source apparatus 11 to the Sink apparatus 12 or a gadget for protecting an audio data to be digitally transmitted.

Elements for protecting digital data are generally classified into two, which are encryption for preventing "wiretapping (eavesdropping)" and authentication for preventing "spoofing."

In the Bluetooth wireless network according to the present embodiment, as for the former encryption, its detailed description will be omitted in the present specification, because an encryption system defined in the Bluetooth layer is applied as it is.

Further, the latter authentication system is mounted not in the Bluetooth layer but in the application layer which is higher than the former layer.

According to an authentication system with respect to the present embodiment, only when succeeding in authentication, a counterparty to be communicated can be considered as an equipment to receive a stream for a rendering use, then without assuming that transmission data may be recorded, the transmission data can be protected with protection of comparatively low intensity. The detailed description thereof will be provided later.

Figure 2:
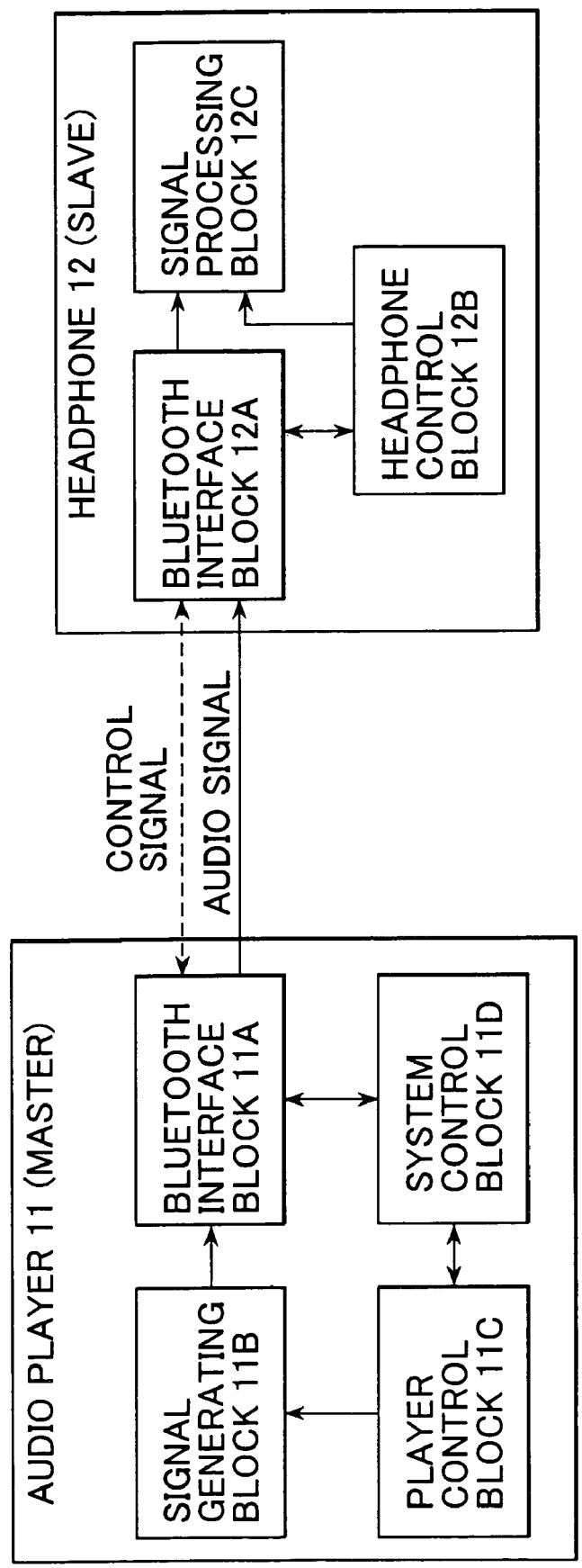
FIG. 2 is a block diagram schematically showing structures of an audio player (master) 11 as Source apparatus and a headphone (slave) as Sink apparatus, both apparatuses constructing the Bluetooth piconet 10 as shown in FIG. 1.

FIG. 2 schematically shows structures of the audio player (master) 11 as a Source apparatus and the headphone (slave) 12 as a Sink apparatus, both apparatuses constructing the Bluetooth piconet 10 as shown in FIG. 1.

The audio player 11 as the Source apparatus comprises a Bluetooth interface block 11A, a signal generating block 11B, a player control block 11C, and a system control block 11D, and functions as a master within the Bluetooth piconet 10.

The Bluetooth interface block 11A is a function block to achieve the Bluetooth wireless connection within piconet 10, exchanges control signals with slave equipments 12, 13, and transmits audio data to them in the piconet 10.

The signal generating block 11B is a function block to generate an audio signal.

The player control block 11C is a function block to achieve media reproduction control function such as reproduction, stop, pause, fast-forward, and fast-rewind of the media by means of the audio player 11.

The system control block 11D is a function block to achieve general control of each of the slave equipments 12, 13 within the Bluetooth piconet 10. In the present embodiment, the system control block 11D is so provided as to control a function of Source in "Advanced Audio Distribution Profile" (A2DP) which is a profile for transmitting audio data between AV equipments.

The A2DP profile also defines protection of audio transmission within the Bluetooth piconet 10. The Bluetooth security basically sets a common parameter referred to as a Link Key between specific two terminals, and one-to-one security is managed between a master and a slave (the Link Key is not disclosed to a third party).

Elements for protecting audio data are generally classified into two, which are encryption for preventing "wiretapping (eavesdropping)" and authentication for preventing "spoofing." As to encryption, the present embodiment employs the encryption system defined for the Bluetooth layer. Further, since an authentication system is not defined in the A2DP profile, an authentication system inherent in the present invention is mounted in the application layer (as will be described hereafter) which is higher than the former layer. According to the authentication system with respect to the present invention, only when succeeding in authentication, the Source apparatus 11 may consider a counterparty to be communicated as a Sink equipment to receive a stream for a rendering use. Consequently, without assuming that transmission data may be recorded at the Sink apparatus, the transmission data can be protected with protection of comparatively low intensity on the Source apparatus side.

The headphone 12 comprises a Bluetooth interface block 12A, a headphone control block 12B and a signal processing block 12C, and is a Sink apparatus dedicated to rendering.

The Bluetooth interface block 12A is a function block to achieve the Bluetooth wireless connection within the Bluetooth piconet 10, exchanges control signals with an audio player 11 as a master apparatus, and receives audio data.

The headphone control block 12B is a function block to achieve an audio output function by means of the headphone 12, such as turning up of volume, turning down of volume, mute, etc.

The signal processing block 12C is a function block to process the audio signal received from the master apparatus 11 via the Bluetooth wireless communication.

In the present embodiment, the headphones 12 may be constructed as a conventional slave apparatus corresponding to a conventional profile for audio transmission, "Bluetooth Advanced Audio Distribution Profile" (A2DP).

Figure 3:
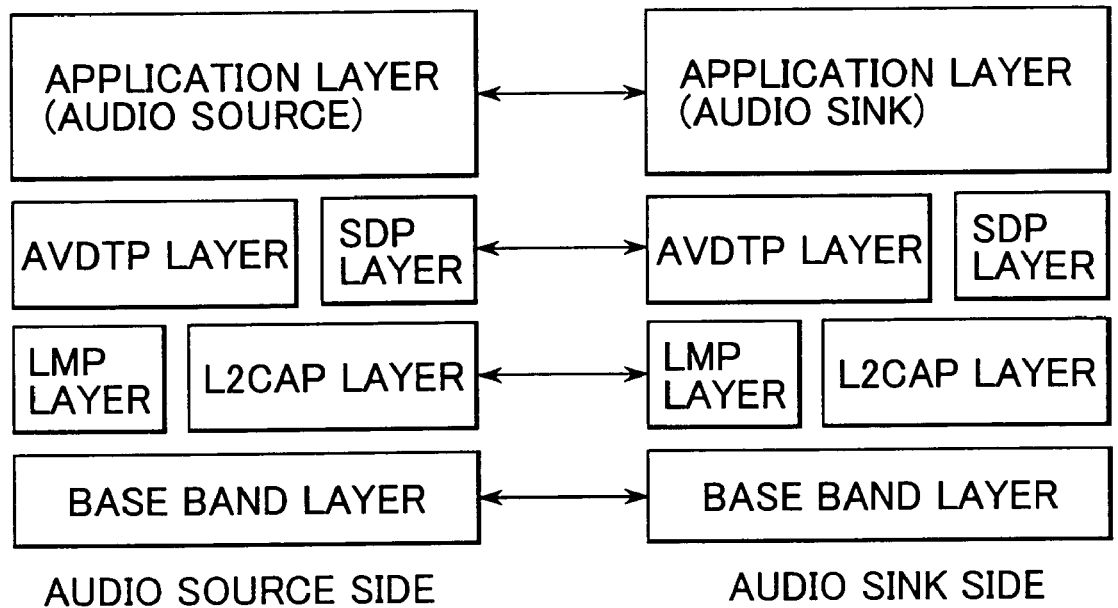
FIG. 3 is a block diagram schematically showing a profile stack structure of a profile "Bluetooth Advanced Audio Distribution Profile" (A2DP) for audio transmission.

In FIG. 3, there is schematically shown a profile stack structure of the "Bluetooth Advanced Audio Distribution Profile" (A2DP) profile for audio transmission.

In the Figure, each of a base-band layer, an LMP layer, an L2CAP layer, an SDP layer, and an AVDTP layer is a Bluetooth protocol defined in the Bluetooth core. Among them, the base-band layer, the LMP layer, and the L2CAP layer correspond to Layer 1 and Layer 2 of the OSI (Open Systems Interconnect) basic reference model.

The SDP layer is a protocol layer to define a Bluetooth Service Discovery Protocol. By using the SDP protocol, the master apparatus 11 as a system controller may detect a function or services provided at the salve equipments 12, 13 in the same Bluetooth piconet 10.

The AVDTP (Audio/Video Distribution Transport Protocol) layer is a protocol layer to define an audio transmission procedure and message exchange in the Bluetooth piconet 10, and comprises a signaling entity for negotiating a parameter of a data stream and a transport entity for handling the data stream itself.

As for the A2DP, encryption at the Bluetooth base-band layer may be optionally mounted. The A2DP does not define protection. An encryption system and an authentication system are defined for each protection system of the A2DP.

The application layer comprises entities which set each parameter of application services and transport services in the Source apparatus 11 or the Sink apparatus 12. The application layer also performs a process for matching audio stream data to a predetermined packet format.

In the present embodiment, the application layer is also equipped with an authentication system for audio transmission within the Bluetooth piconet 10. According to the authentication system, only when succeeding in authentication, the Source apparatus 11 may consider that a counter-party to be communicated is a Sink equipment receiving a stream for a rendering use. Consequently, without assuming that transmission data may be recorded on the Sink apparatus side, the Source apparatus 11 can protect the transmission data with protection of comparatively low intensity.

At the profile stack as shown in FIG. 3, there are provided setting, control, and operation for audio transmission between the Source apparatus 11 and the Sink apparatuses 12, 13 within the Bluetooth piconet 10. However, the profile stack can not perform one-multi data distribution.

In audio transmission between the Source apparatus 11 and the Sink apparatuses 12, 13, there is a somewhat delay because of radio signal processing, buffering and encoding/decoding the data stream.

Further, in order to mount the profile stack, a transmission rate of the audio data should be small enough compared with a bit rate usable over the Bluetooth link. This is because packet re-transmission is carried out in order to remove effects of a noticeable noise and a vanished packet which may cause sound skipping.

The AVDTP for providing audio transmission in the Bluetooth wireless network may be generally classified into two functions referred to as "signaling" and "streaming."

The streaming defines real time transmission of an audio signal. And the signaling negotiates a format etc. so that the audio stream transmitted from the Source apparatus may be received and processed on the Sink apparatus side. As an example of such negotiation parameters is a type of Content Protection (CP).

A protection system applied to the Bluetooth AV transmission is pre-registered at the Bluetooth SIG, and identification information (ID) is assigned to each protection system on the Bluetooth side. The ID may be referred to "Bluetooth Assigned Numbers." Of course, none of registered contents of the protection system is described in a Bluetooth specification. For example, the contents protection system according to the present invention may be subject to a license outside the Bluetooth SIG so as to define restrictions.

As for the AVDTP protocol, in a Connection Establishment procedure, by using a "Stream Get Capability" command, the Source apparatus examines a protection system to which the Sink apparatus corresponds that is a destination for audio. Further, by designating an ID by means of a "Stream Set Configuration" command, the Source apparatus sets the protection system to be applied to the Sink apparatus (in the AVDTP protocol, being registered at the Bluetooth Assigned Numbers, the ID of protection system of contents is uniquely determined).

Figure 4:
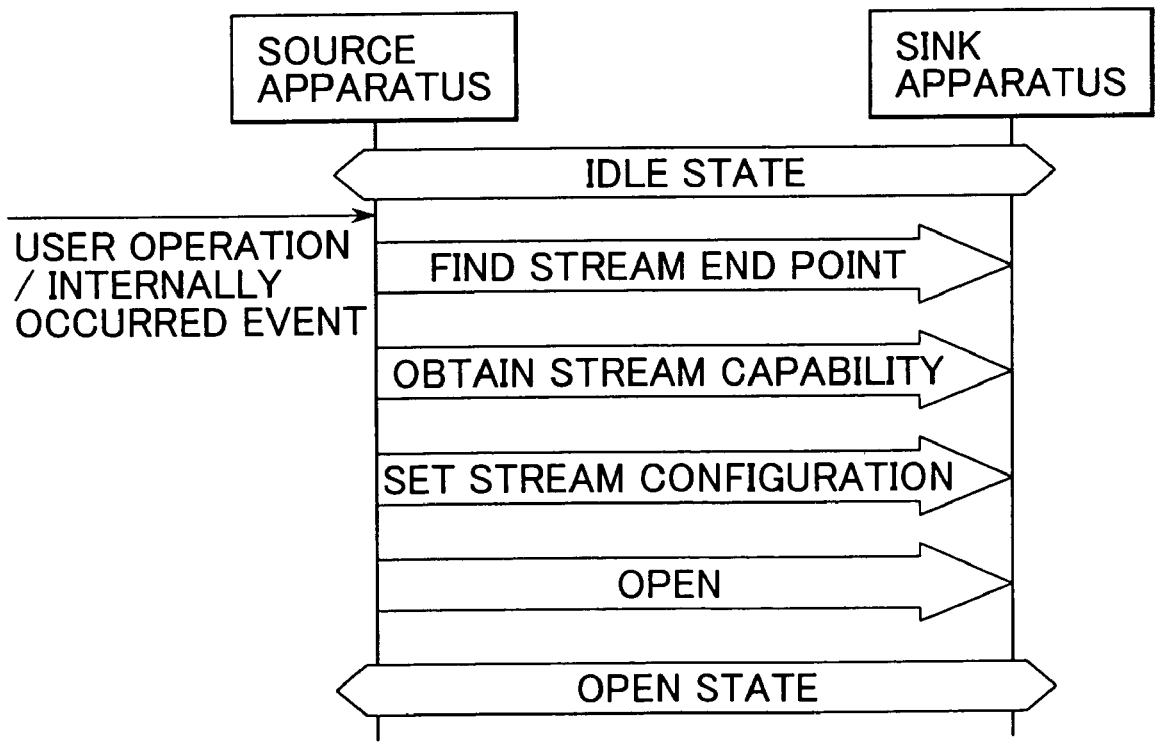
FIG. 4 is a diagram showing a sequence of Connection Establishment procedure in AVDTP protocol.

In FIG. 4, there is shown a sequence of the Connection Establishment procedure in the AVDTP protocol. In the AVDTP protocol, a Stream End Point is defined as entrance and exit of a Stream of the Bluetooth device. By using a "Stream End Point Discovery" command, the Source apparatus determines to what system of stream the Sink apparatus corresponds and a stream type (audio or video) corresponding to each. Then, by using "Stream Get Capability", the Source apparatus examines a protection system to which the Sink apparatus corresponds that is a destination for audio. Subsequently, the Source apparatus transmits an Open command to the Sink apparatus so that both of the Source apparatus and the Sink apparatus become an "open" state.

Subsequent processes vary depending on the protection system which is employed for the Bluetooth audio transmission. As for the present embodiment, at the application layer, by using "Security Control" command defined in the AVDTP protocol, the Sink apparatus is authenticated so as to be protected (a parameter of "Security Control" command may be defined for each protection system).

Figure 5:
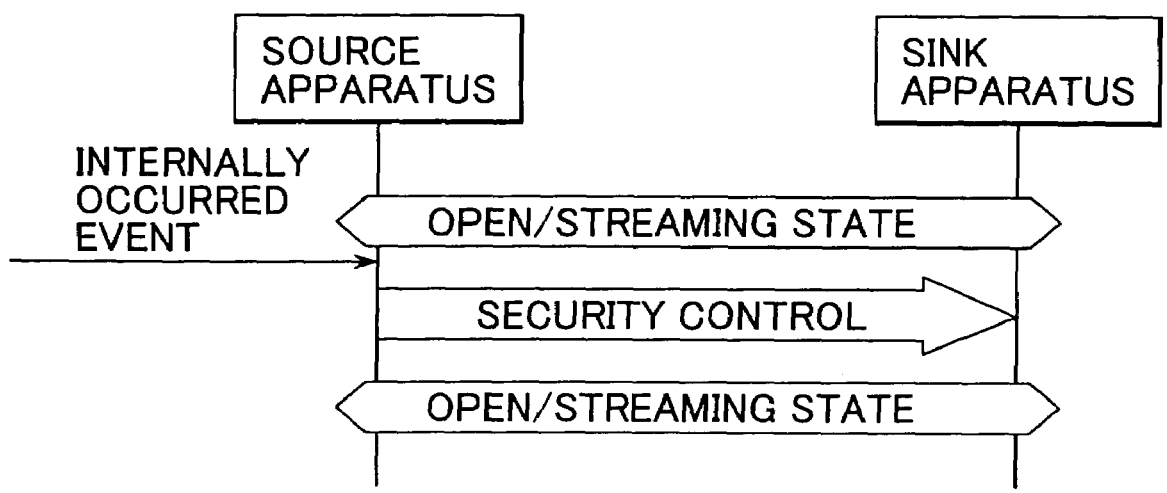
FIG. 5 is a diagram showing a sequence of Security Control process defined in the AVDTP protocol.

In FIG. 5, there is shown a sequence of Security Control process defined in the AVDTP protocol. As shown in the figure, the "Security Control" command is executed in an open state or a streaming state. The execution does not cause a change in a state of the Bluetooth transmission.

In the present embodiment, the Source apparatus 11 performs audio transmission, assuming that only when succeeding in authentication, a counterparty to be communicated is considered as a Sink equipment to receive a stream for a rendering use, so that the rendering of transmission data is carried out in the Sink apparatus (in other words, recording is not carried out). Its detail will be described hereafter.

Figure 6:
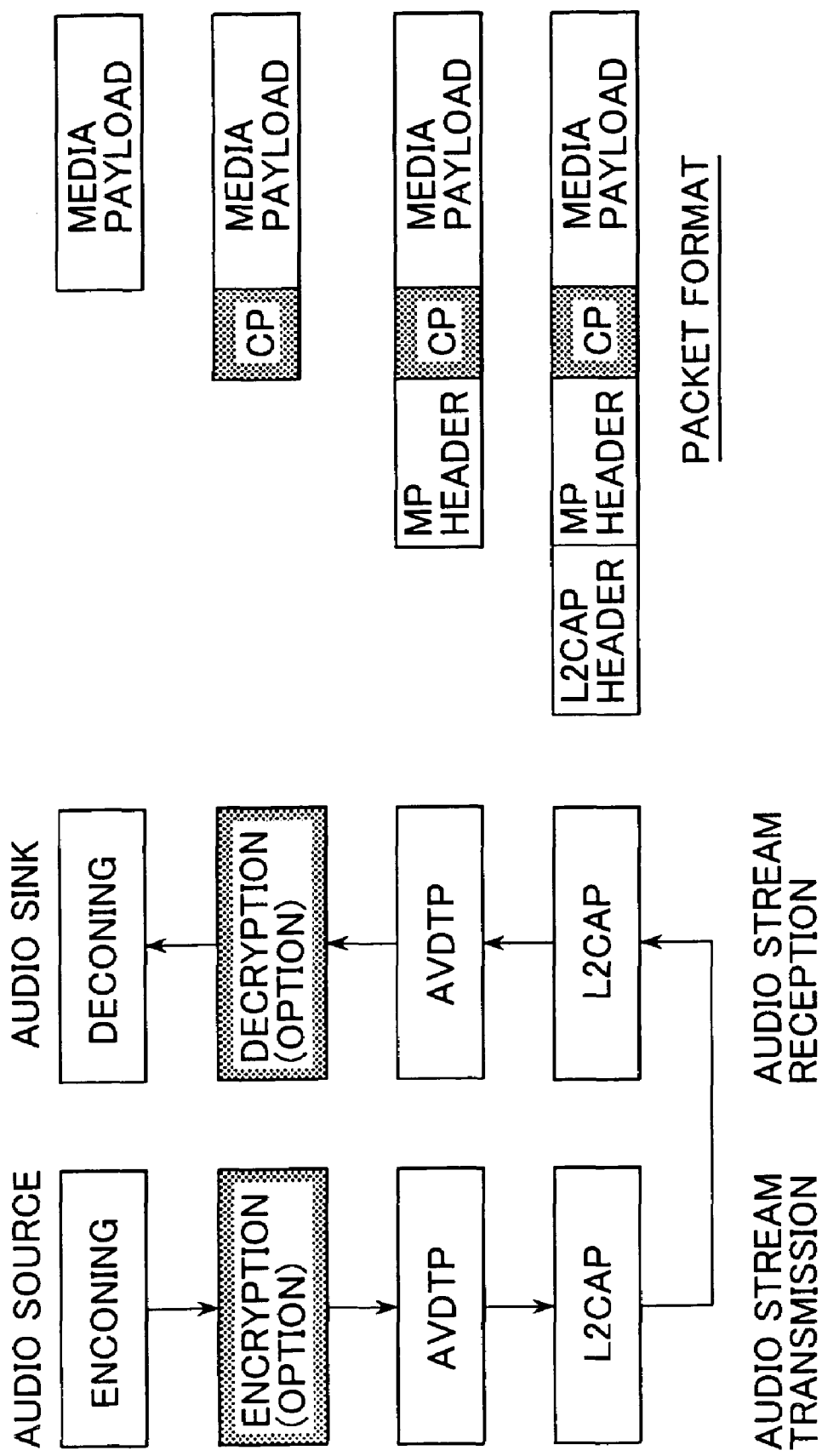
FIG. 6 is a block diagram schematically showing a flow of an audio streaming and a packet format in a Bluetooth wireless network.

Streaming is described in "Advanced Audio Distribution Profile" (A2DP) which is a profile for audio transmission. In FIG. 6, there is schematically shown a flow of an audio streaming and a packet format in the Bluetooth wireless network.

When wishing to start streaming of audio contents, streaming connection is set up at first. During the process of setting up, an appropriate parameter is selected for the audio streaming between respective apparatuses. Two kinds of services are formed, which are application service capability and transport service capability. The A2DP profile defines a parameter for audio specification which is necessary for a signaling procedure.

The application service capability of the A2DP comprises audio CODEC capability and content protection capability.

And the transport service capability selects services provided in the AVDTP protocol in order to handle a streaming packet suitably.

When streaming connection is established, a streaming start procedure is executed. A procedure for performing the streaming transmission by using the AVDTP protocol is defined in a "Generic Audio/Video Distribution Profile" (GAVDP).

As soon as both of the Source apparatus and the Sink apparatus become a "streaming state", transmission/reception of an audio stream may be carried out. The Source apparatus transmits the audio data by using a "Send Audio Stream" procedure, while the Sink apparatus receives the audio data using a "Receive Audio Stream" procedure.

When in an "open state", for starting the transmission/reception of the audio stream, the Source apparatus or the Sink apparatus must start a Start Streaming procedure defined in the GAVDP.

In the "Send Audio Stream" procedure, the Source apparatus encodes transmission data to a selected format in a signaling session. In the application layer of the Source apparatus, the encoded data are matched with a defined media payload (MP) format. When using the content protection (CP), a CP header depending on a content protection system is added to the leading head of an encrypted audio content.

Consequently, the stream data is processed in the AVDTP layer via an interface and transmitted from a transport channel by using transport services defined in the AVDTP protocol.

While, by using transport services defined in the AVDTP protocol and receiving over the transport channel, the AVDTP layer on the Sink apparatus side transfers a received stream to the application layer via the interface.

When the content protection system is in operation, the application layer on the Sink apparatus analyzes the CP header and decrypts the encrypted content. Then, an audio data frame is decoded by means of a predetermined coding system and employed for audio output (rendering) and the like.

Figure 7:
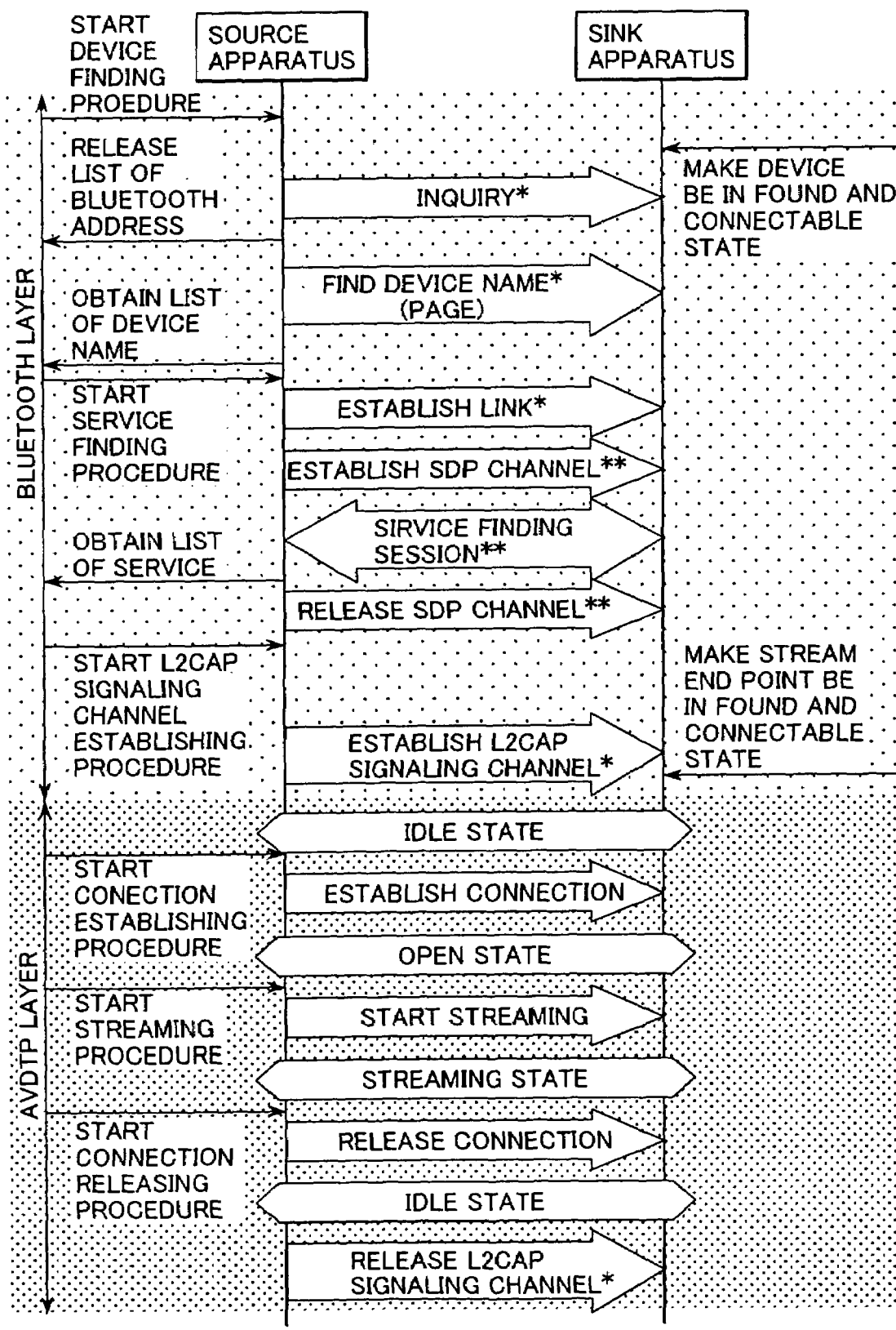
FIG. 7 is a diagram showing a flow of a process between the Source apparatus and the Sink apparatus for setting up and releasing the streaming according to a GAVDP between the Source apparatus 11 and the Sink apparatus 12.

In FIG. 7, there is shown in detail a flow of a process between the Source apparatus and the Sink apparatus for setting up and releasing the streaming according to the GAVDP between the Source apparatus 11 and the Sink apparatus 12. It should be appreciated that in the figure, an item with "*" is a procedure defined in "Generic Access Profile" (GAP), and an item with "**" is a procedure defined in "Service Discovery Protocol" (SDP). The GAP and the SDP are common and basic functions of the Bluetooth.

Firstly, the Source apparatus 11 which is also a master in the Bluetooth piconet 10 broadcasts an IQ packet for making Inquiry in the piconet 10 in order to check what kind of slaves are in the piconet 10.

The Sink apparatus 12 as a slave which has received the Inquiry returns an FHS packet for notifying its Bluetooth address (BD_ADDR), clock signal information, a Class of Device.

The Source apparatus 11 selects which of slaves should be connected according to data of the FHS packet received from each slave within the piconet. In this case we assume that the Sink apparatus 12 has been selected for the purpose of simplicity.

In a Name Discovery procedure, the Source apparatus 11 as a master, notifies a master attribute destined for the Sink apparatus 12 as a slave by means of Page (paging transmission) and causes a transition to a communication phase via one-to-one process between the master and the slave, to thereby obtain a Bluetooth Device Name of its counterparty communicating with by means of Name Request.

Then, in a Link Establishment procedure, a physical link is constructed between the Source apparatus 11 and the Sink apparatus 12 as Bluetooth devices. The Link Establishment procedure includes negotiation of encryption and Authentication in the Bluetooth base band layer (refer to FIG. 3). However, it should be appreciated that the Bluetooth security is directed to prevention of misconnection and security and therefore is different from the authentication system according to the present invention.

Then, in order to detect Service Discovery, that is a function or services which the slave comprises, an L2CAP channel for the SDP (logical link channel) is provided so as to find to what kind of services the Sink apparatus 12 corresponds by means of the SDP protocol (in other words, information about a protocol, a profile etc. to which the Sink apparatus 12 corresponds).

After releasing the L2CAP channel for the SDP, a L2CAP channel for AVDTP signaling is provided. As mentioned above, during the Connection Establishment procedure, information relating to the content protection system is disclosed and set according to information of the audio CODEC, sampling frequency, etc.

In the present embodiment, by designating and ID by means of the "Stream Set Configuration" command, the Source apparatus 11 sets a protection system to be employed to the Sink apparatus 12 in the Connection Establishment procedure (see FIG. 4) in the AVDTP protocol. By using the "Security Control" command defined in the AVDTP protocol (see FIG. 5), the type of the Sink apparatus 12 is authenticated (in other words, an equipment to receive a stream for a rendering use or an equipment to receive a stream for a recording use).

The Sink apparatus 12 which is a headphone shows itself to be an equipment for a rendering use, so that on the Source apparatus 11 side it employs an authentication system assumed to receive a transmission data stream for a rendering use at the Sink apparatus 12.

Figure 8:
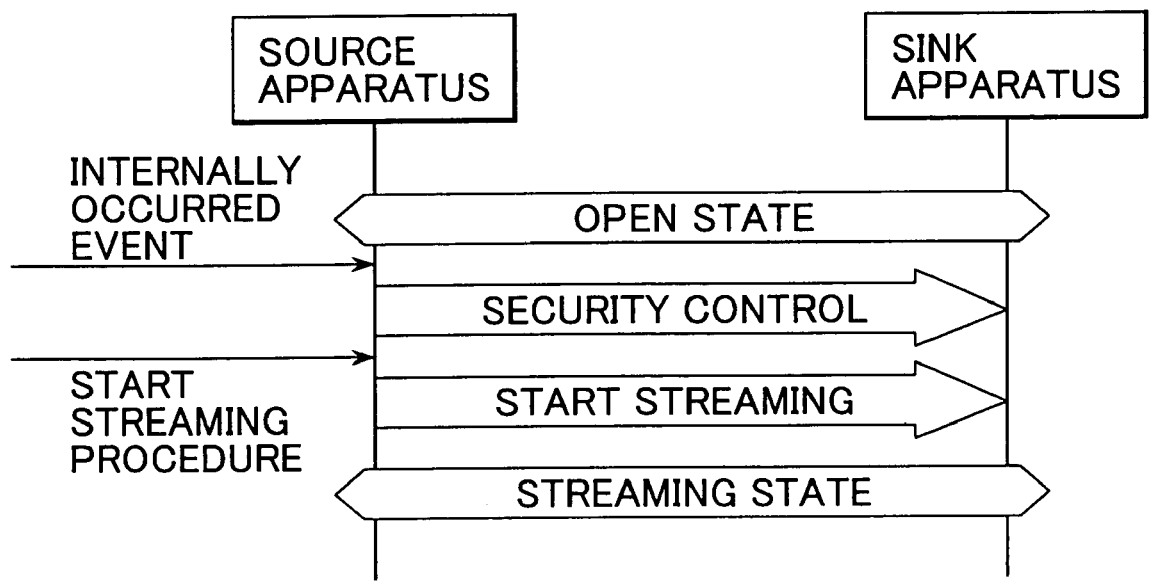
FIG. 8 is a diagram showing a sequence when succeeding in an authentication process defined in the AVDTP protocol.

Upon success of the authentication, when it is proven that the Sink apparatus 12 is an equipment for a rendering use, the audio stream is transmitted through Streaming Start procedure as defined in the GAVDP. In FIG. 8, there is shown a sequence when succeeding in an authentication. As shown in the figure, in an open state, the Source apparatus, in response to occurrence of an internal event, issues the "Security Control" command so as to perform authentication. When succeeding in this, according to the start of internal streaming, the Source apparatus issues the "Start Streaming" command so as to perform a streaming transmission to the Sink apparatus.

Figure 9:
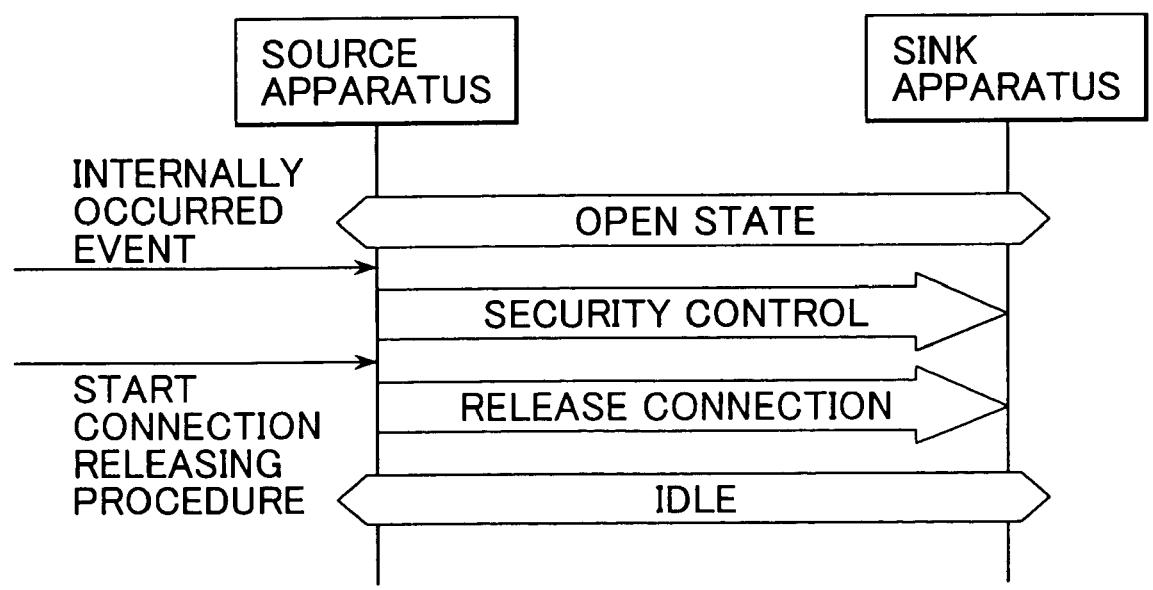
FIG. 9 is a diagram showing a sequence when failing in the authentication process defined in the AVDTP protocol.

While, in the case of failure in authentication, on the Source apparatus 11 side, the application layer is noticed, whereby the audio stream transmission is not carried out. In FIG. 9, there is shown a sequence when failing in the authentication. As shown in the figure, in an open state, the Source apparatus, in response to occurrence of an internal event, issues the "Security Control" command so as to perform authentication. When failing in this, in response to internal connection release, the Source apparatus issues a "Connection Release" command so as to disconnect the Sink apparatus, thereby causing a transition to an idle state.

Figures 10, 11, 12:
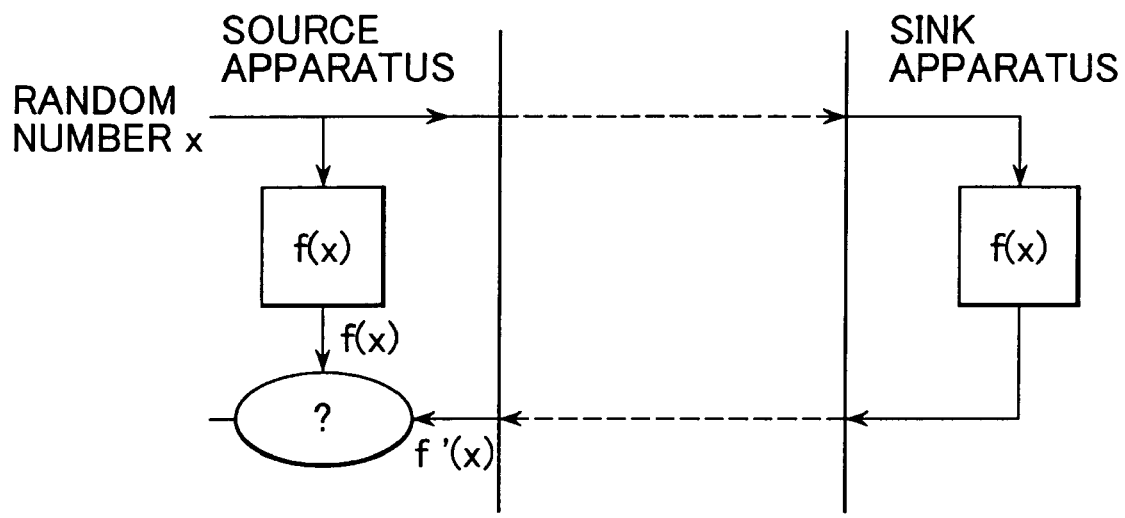
FIG. 10 is a block diagram showing a concept of an authentication procedure carried out between the Source apparatus 11 and the Sink apparatus 12 in the Bluetooth piconet 10 according to the present embodiment.
FIG. 11 is a diagram showing a structure of a data frame used for a command of "Stream Get Capability."
FIG. 12 is a diagram showing a structure of a data frame used for a response to the "Stream Get Capability" command.

In FIG. 10, there is illustrated a concept of an authentication procedure carried out between the Source apparatus 11 and the Sink apparatus 12 in the Bluetooth piconet 10 according to the present embodiment.

A random number x generated in the Source apparatus 11 is transmitted as a kind of control signal to the Sink apparatus 12. In the example as shown in the figure, both of the Source apparatus 11 and the Sink apparatus 12 commonly own an authentication algorithm as shown by f(x), and the Sink apparatus 12 performs an operation for a received input x so as to transmit its result f'(x) to the Source apparatus 11 as a kind of control signal. And the Source apparatus 11 compares a result f(x) calculated by itself from the random number x with the result f'(x) received from the Sink apparatus 12 so as to determine authentication depending on whether or not these match with each other.

A feature of the authentication system with respect to the present embodiment is that the Source apparatus 11 switches the operational expression f(x) depending on types of Sink apparatus 12 to be authenticated. The types of the Sink apparatus herein are classified according to whether the apparatus is an equipment of low processing power such as headphones (Type 1) or an equipment of high processing power such as a personal computer (PC) (Type 2).

For example, when the Sink apparatus to be communicated is an equipment of low processing power such as headphones 12, the Source apparatus 11 permits the generating random number to be 8 bits and the operation f(x) to be a simple operational expression such as a bit shift. An equipment of low processing power such as headphones or a Type 1 is generally provided with a CPU of relatively low processing power and therefore is not so suitable for a high level authentication process of high intensity and of high CPU processing load.

Whereas, when the Sink apparatus to be communicated is an apparatus equipped with a CPU of comparatively high processing power such as the personal computer (PC) 13, such a simple operational expression as mentioned above easily allows "spoofing" and may not sufficiently protect contents. Thus, when the Sink apparatus is a Type 2, the Source apparatus 11 makes the generating random number x longer, 64 bits, 128 bits or the like, and employs a relatively complicated function such as an eclipse function as the operational expression f(x).

As for the operation of the authentication, an example where a random number is input to be operated in here, however, not only a random number but data inherent to the apparatus such as the Bluetooth address (BD_ADDR) of the Sink apparatus may be used so as to increase the intensity of authentication.

As mentioned above, when switching an authentication system corresponding to a use of the Sink apparatus to be communicated, the most important is a method for determining the type of the Sink apparatus. For example, a personal computer which does not comply with the authentication system according to the present invention (that is, out of restriction of license) disguises "headphones" so as to record a stream data fraudulently, which must be avoided.

An equipment of heavy load of authentication operation (for example, a PC having a high operational function) basically employs the Type 2. Whereas, the authentication system according to the present invention restricts objective equipments of the Type 1.

A method for determining the type of the Sink apparatus (Type 1, Type 2) will be described in detail hereafter:

(1) Self-Assessment

A CP-TYPE shows that the Sink apparatus received the "Stream Get Capability" command from the Source apparatus corresponds to the content protection system according to the present embodiment. Data frame structures used for the "Stream Get Capability" command and response are respectively shown in FIG. 11 and FIG. 12.

The Source apparatus corresponding to the content protection system according to the present embodiment sends a "Stream Set Configuration" command to the Sink apparatus so as to set the protection system to be employed. A data frame structure used for the "Stream Set Configuration" command and response is shown in FIG. 13.

Then, by using the "Security Control" command, the Source apparatus asks the Sink apparatus about its type. Data frame structures used for the "Security Control" command and response are respectively shown in FIG. 14 and FIG. 15. "Content Protection Scheme Dependent" field structures in these command and response when asking the type are respectively shown in FIG. 16 and FIG. 17.

A field length of a "Content Protection Scheme Dependent" field is variable depending on a class of a command response. In the case of a type inquiry command, it is 1 bite where the class of the command response is indicated by 4 bits, and the other 4 bits indicate a parameter. For the type inquiry command, 4 bits indicate a type when responding. The Type 1 is represented by "0001", and the Type 2 is represented by "0010."

(2) Confirmation of Type 1

When the Sink apparatus reports a self-assessment of the Type 2, authentication is carried out by a system in accordance with the Type 2. When the Sink apparatus returns a value other than the Type 1 and the Type 2, it is considered to have failed in authentication. When the Sink apparatus reports a self-assessment of the Type 1, the following procedures are further executed for confirmation.

(2-1) Class of Device

During Inquiry procedure, the Source apparatus obtains a Class of Device of the Sink apparatus (see FIG. 7) so that a type of the Sink apparatus may be confirmed based on Class of Device information of the Sink apparatus. As defined in "Bluetooth Assigned Numbers", each Bluetooth equipment indicates what itself is by "Major Device Class" and "Minor Device Class." When the Major Device Class of the Sink apparatus is a "Computer", the Sink apparatus is subject to authentication by the Type 2. The self-assessment of the Type 1 is considered to be "spoofing." In other words, at the time when the Major Class Device of the Sink apparatus is a "Computer", the authentication is considered as failed.

In FIG. 18, there is schematically shown a data structure of Class of Device information field. As shown in the figure, five bits from the twelfth bit from the leading head of the filed are allocated to the Major Device Class. And allocation of the Major Device Class as defined by the Bluetooth Assigned Numbers is shown in FIG. 19.

(2-2) Profile

When the Major Device Class is not a "Computer" but an apparatus of high function, it is not subject to the Type 1 which is a simple authentication system. Then, the Source apparatus checks whether or not there is a Bluetooth application profile supported by the Sink apparatus except for audio transmission, to thereby find a support profile of the Bluetooth equipment by means of the SDP.

When the Sink apparatus does not support a profile except for the A2DP, the Sink apparatus is identified as the Type 1 or as subject to authentication for a rendering use.

When the Sink apparatus corresponds to another profile, determination is carried out according to the corresponding file. When the Sink apparatus supports either one profile of the Personal Area Network (PAN), the LAN Access Profile (LAN), the Object Push, and the File Transfer, the Sink apparatus is identified as subject to authentication as the Type 2, and the authentication is considered as failed.

(3) Authentication

By using a "Security Control" command, the Source apparatus performs authentication as to whether the Sink apparatus is the Type 1 or the Type 2. Structures of "Content Protection Scheme Dependent" field at the command and response of the "Security Control" command when authenticating are respectively shown in FIG. 20 and FIG. 21.

Figure 22:
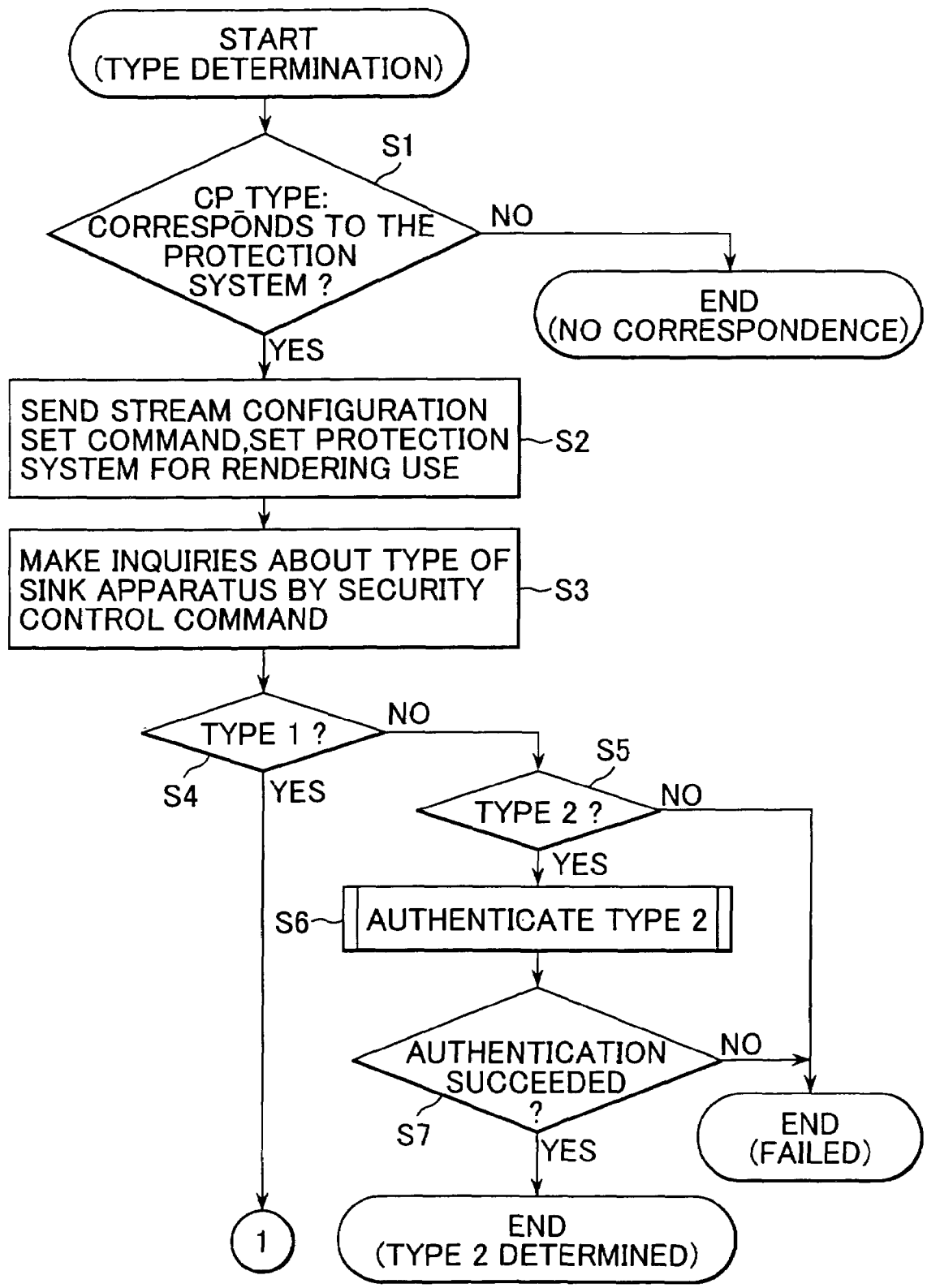
FIG. 22 is a flow chart showing a procedure (first half) for carrying out authentication by determining a type of the Sink apparatus by means of the Source apparatus.
Figure 23:
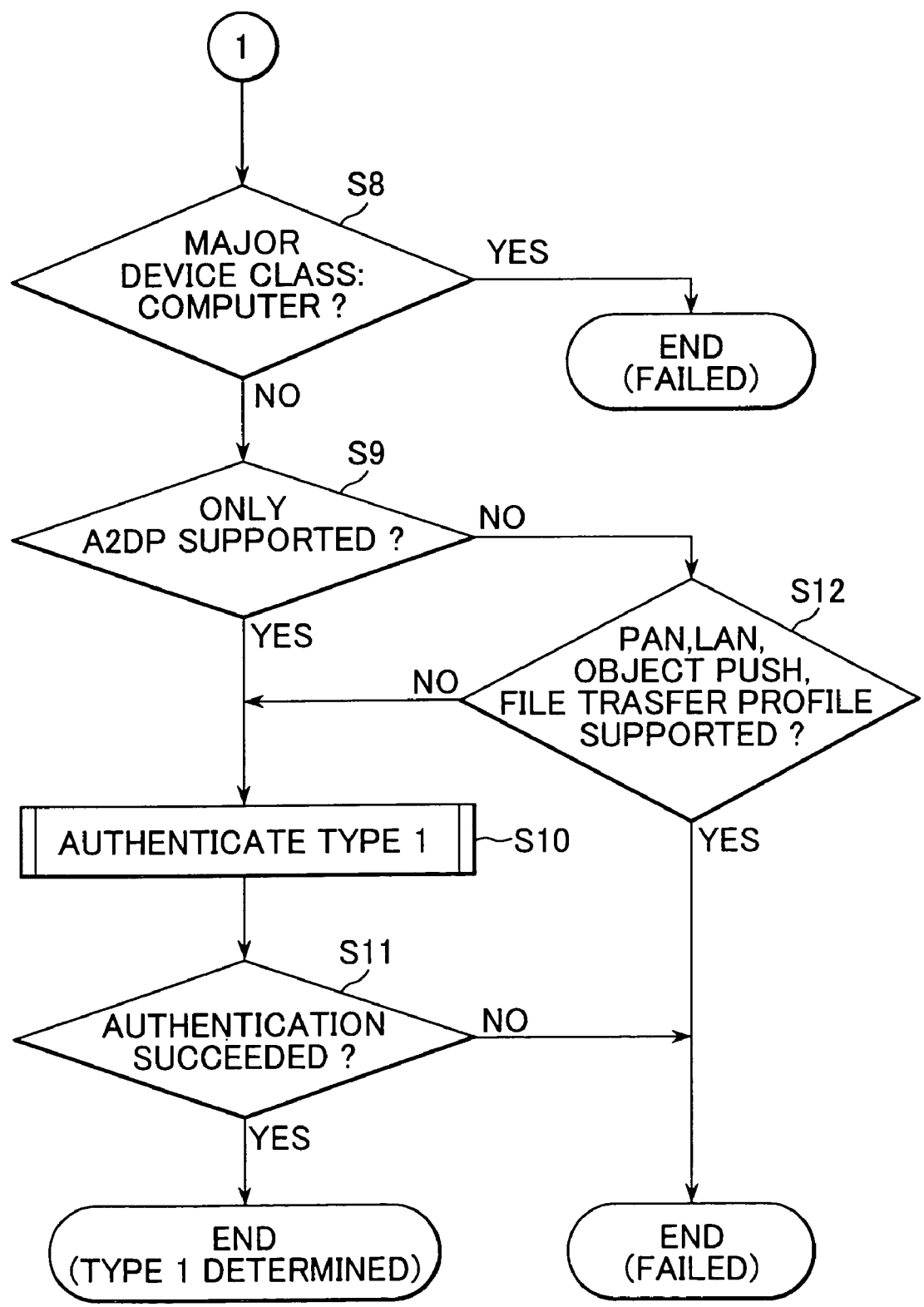
FIG. 23 is a flow chart showing a procedure (last half) for carrying out the authentication by determining the type of the Sink apparatus by means of the Source apparatus.

In FIG. 22 and FIG. 23, there are shown procedures, in a flow chart format, for carrying out authentication by determining a type of the Sink apparatus 12 by means of the Source apparatus 11. According to these flow charts, authentication procedure with respect to the present embodiment will be described hereafter.

We assume that the Source apparatus 11 establishes connection with the Sink apparatus 12 in the Bluetooth base band layer, obtains a Class of Device of the Sink apparatus by paging (Page), and further obtains services (corresponding protocol and profile) supported by the Sink apparatus by means of the SDP protocol.

According to the AVDTP protocol, the Source apparatus 11 transmits a "Stream Get Capability" command to the Sink apparatus 12, based on a value indicated by the CP_TYPE of its response, determines whether or not the Sink apparatus 12 corresponds to the content protection system according to the present invention (step S1).

Based on the CP_TYPE, when the Sink apparatus 12 does not correspond to the present protection system, the whole procedure routine is ended.

On the other hand, the Sink apparatus 12 is determined to correspond to the present protection system, the Source apparatus 11 sends the "Stream Set Configuration" to the Sink apparatus 12 so as to set the present protection system to be employed (step S2). The procedure so far may be carried out according to the AVDTP protocol.

Then, using a "Security Control" command, the application layer of the Source apparatus 11 makes inquiries about a type to the Sink apparatus 12 (step S3). The inquiries made in here or authentication processing are based on the self-assessment from the Sink apparatus 12. The type of the Sink apparatus 12 classified depending on whether the apparatus is an equipment of low processing power such as headphones (Type 1) or an equipment of high processing power such as a personal computer (PC) (Type 2).

When the Sink apparatus 12 returns a value other than the Type 1 (step S4), it is determined whether or not the Sink apparatus 12 has reported self-assessment of the Type 2 (step S5).

When the Sink apparatus 12 reports self-assessment of the Type 2 (step S5), the whole of the present procedure routine is ended, subsequently authentication is carried out by means of a system in accordance with the Type 2 (step S6). The authentication system in accordance with the Type 2 may be realized in such a way that, for example, in an authentication mechanism as shown in FIG. 10, the Source apparatus 11 makes the generating random number x longer such as 64 bits and 128 bits, and employs a relatively complicated function such as an eclipse function as the operational expression f(x).

When succeeding in authentication in accordance with the Type 2 (step S7), the present procedure routine ends successfully. Whereas, when failing in the Type 2 authentication, the authentication is considered to have failed and the whole of the present procedure routine is ended. Further, when the Sink apparatus 12 has returned a value other than the Type 2 (step S5), the authentication is considered to have failed and the whole of the present procedure routine is ended.

When the Sink apparatus 12 reports self-assessment of the Type 1 (step S4), the Class of Device of the Sink apparatus 12 is confirmed (step S8). The Class of Device of the Sink apparatus 12 has already-been obtained by paging (Page) during the Name Discovery procedure.

When the Major Device Class of the Sink apparatus 12 is a "Computer", the Sink apparatus 12 is subject to authentication by the Type 2. The self-assessment of the Type 1 is considered to be "spoofing" (step S8). In other words, when the Major Device Class of the Sink apparatus is a "Computer", the authentication is considered as failed at this time.

On the other hand, when the Major Device Class is not a "Computer" but an apparatus of high function, it is not subject to the Type 1 which is a simple authentication system. Then, the Source apparatus 11 checks whether or not there is a Bluetooth application profile supported by the Sink apparatus 12 except for audio transmission (step S12).

When the Sink apparatus 12 does not support a profile except for the A2DP, the Sink apparatus 12 is identified as subject to authentication of the Type 1, and an authentication system in accordance with the Type 1 is carried out (step S10). The authentication system in accordance with the Type 1 is realized in such a way that in an authentication mechanism as shown in FIG. 10, for example, the Source apparatus makes the generating random number x be 8 bits and employs a comparatively simple function for the operational expression f(x) such as a bit shift. When succeeding in authentication in accordance with the Type 2 (step S11), the present procedure routine ends successfully. Whereas, when failing in the Type 1 authentication, the authentication is considered to have failed and the whole of the present procedure routine is ended.

When the Sink apparatus 12 supports a profile other than the A2DP, it is further determined whether or not the Sink apparatus 12 supports any one of a Personal Area Network (PAN), a LAN Access Profile (LAN), an Object Push Profile, and a File Transfer Profile (step S8).

When the Sink apparatus 12 supports either one of the Personal Area Network (PAN), the LAN Access Profile (LAN), the Object Push Profile, and the File Transfer Profile (step S9), the Sink apparatus 12 is identified as subject to authentication as the Type 2, and the authentication is considered as failed.

While, when the Sink apparatus 12 does not support any one of the Personal Area Network (PAN), the LAN Access Profile (LAN), the Object Push Profile, and the File Transfer Profile (step S9), the Sink apparatus 12 is identified as subject to authentication as the Type 1, and the authentication system in accordance with the Type 1, the whole of the present procedure routine is ended (the same as above).

A Bluetooth Profile Descriptor List of the SDP enumerates profiles to which the equipments correspond. The UUID is allocated with the Bluetooth Assigned Numbers to each profile. In FIG. 24, there is shown an example of the UUID (abridgement). In the above-mentioned steps S9 and S12, the profiles supported by the equipments may be determined by referring to the UUID of the Bluetooth Profile Descriptor List.

Addenda

With reference to particular embodiments, the present invention has been described in detail. However, it will be apparent for those skilled in the art to modify or substitute the embodiments without departing from the scope of the present invention.

In the specification, taking a Bluetooth wireless network to which the present invention is applied as an example, the present invention has been described, however, the scope of the present invention is not limited thereto. The present invention may be applied to other wired or radio transmission systems which handle similar device information, service information.

In effect, the present invention has been disclosed by way of examples, the description in the present specification should not be construed as limits. In order to determine the scope of the present invention, initially described claims should be considered.

INDUSTRIAL APPLICABILITY

According to the present invention, there may be provided a radio communication system, a radio communication control apparatus and a radio communication control method, a storage medium, and a computer program, which are good and where audio data may be suitably transmitted between equipments interconnected by wireless within a predetermined communication cell.

Further, according to the present invention, there may be provided a radio communication system, a radio communication control apparatus and a radio communication control method, a storage medium, and a computer program, which are good and where audio data may be suitably transmitting between equipments within a piconet including a master equipment and a plurality of slave equipments, such as Bluetooth.

Furthermore, according to the present invention there may be provided a radio communication system, a radio communication control apparatus and a radio communication control method, a storage medium, and a computer program, which are good and where digital data such as audio data may be suitably transmitted between the Bluetooth equipments with providing with predetermined protection.

According to the resent invention, when transmitting data such as audio data which require protection to be provided by means of the Bluetooth connection, difficulty levels of the authentication systems are switched corresponding to processing power of the equipments to be communicated so that secure audio transmission by the Bluetooth may be achieved. Thus, even for an equipment of low processing power such as headphones, the Bluetooth communication based on the SDMI may be performed. Further, for a communicating counterparty which is an equipment having high processing power, such as a personal computer, sufficient countermeasures against hacking may be taken.

The invention claimed is:

1. A radio communication control method for controlling transmission of a data stream by a source apparatus to a sink apparatus in a radio cell, the method comprising:
   determining processing power of the sink apparatus according to services supported by the sink apparatus based on a self-assessment by the sink apparatus;
   classifying, based on the processing power, the sink apparatus as either a first type or a second type;
   obtaining a device class from the sink apparatus;
   comparing the device class to the classified first type or the classified second type;
   selecting, based on the processing power when the device class matches the classified first type or the classified second type, an authentication system for authenticating the source apparatus and the sink apparatus, wherein authentication comprises:
      selecting a first authentication method for the first type of sink apparatus; and
      selecting a second authentication method for the second type of sink apparatus; and
   communicating with the sink apparatus based on the selected first authentication method or the selected second authentication method.

2. The radio communication control method as claimed in claim 1, wherein:
   determining the processing power of the sink apparatus comprises using a self-assessment from the sink apparatus.

3. The radio communication control method as claimed in claim 1, wherein:
   the radio cell is established using a Bluetooth wireless network; and
   determining the processing power of the sink apparatus comprises using a self-assessment from the sink apparatus, the self-assessment being a stream get capability command.

4. The radio communication control method as claimed in claim 1, wherein:
   the radio cell is established using the Bluetooth wireless network; and
   determining comprises querying the sink apparatus to determine the processing power of the sink apparatus, the query being a security control command.

5. The radio communication control method as claimed in claim 1, wherein:
   the radio cell is established using a Bluetooth wireless network; and
   determining the processing power of the sink apparatus comprises using class of device information obtained during an inquiry procedure.

6. The radio communication control method as claimed in claim 1, wherein:
   the radio cell is established using the Bluetooth wireless network; and
   the processing power is determined according to services obtained by a service discovery corresponding to the sink apparatus.

7. The radio communication control method as claimed in claim 6, wherein:
   a sink apparatus that uses an A2DP Bluetooth advanced audio distribution profile is determined to have a low processing power and is classified as the first type of sink apparatus.

8. The radio communication control method as claimed in claim 6, wherein:
   a sink apparatus that uses a personal area network profile, a LAN access profile, an object push profile, or a file transfer profile is determined to have a high processing power and is classified as the second type of sink apparatus.

9. A storage medium comprising computer software which, when executed by a processor, performs a method for controlling transmission of a data stream by a source apparatus to a sink apparatus in a radio cell, the method comprising:
   determining a processing power of the sink apparatus according to services supported by the sink apparatus based on a self-assessment by the sink apparatus;
   classifying, based on the processing power, the sink apparatus as either a first type or a second type;
   obtaining a device class from the sink apparatus;
   comparing the device class to the classified first type or the classified second type;
   selecting, based on the processing power when the device class matches the classified first type or the classified second type, an authentication system for authenticating the source apparatus and the sink apparatus, wherein authenticating comprises:
      selecting a first authentication method for the first type of sink apparatus; and
      selecting a second authentication method for the second type of sink apparatus; and
   communicating with the sink apparatus based on the selected first authentication method or the selected second authentication method.

* * * * *